(12) United States Patent
McDevitt

(10) Patent No.: US 12,407,888 B2
(45) Date of Patent: *Sep. 2, 2025

(54) DIGITAL MEDIA CONTENT MANAGEMENT SYSTEM AND METHOD

(71) Applicant: HSNi, LLC, St. Petersburg, FL (US)

(72) Inventor: John McDevitt, Clearwater, FL (US)

(73) Assignee: HSNi, LLC, St. Petersburg, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/176,956

(22) Filed: Feb. 16, 2021

(65) Prior Publication Data

US 2022/0021923 A1 Jan. 20, 2022

Related U.S. Application Data

(63) Continuation of application No. 16/841,926, filed on Apr. 7, 2020, now Pat. No. 10,958,960, which is a
(Continued)

(51) Int. Cl.
*H04N 21/41* (2011.01)
*H04N 21/43* (2011.01)
(Continued)

(52) U.S. Cl.
CPC ... *H04N 21/41265* (2020.08); *H04N 21/4122* (2013.01); *H04N 21/43079* (2020.08);
(Continued)

(58) Field of Classification Search
None
See application file for complete search history.

(56) References Cited

U.S. PATENT DOCUMENTS 9,571,875 B2 * 2/2017 McDevitt ......... H04N 21/41265
9,924,215 B2 * 3/2018 McDevitt ........... H04N 21/8133
(Continued)

FOREIGN PATENT DOCUMENTS

KR  20100005437 A   1/2010
KR  1020120124543 A  11/2012
WO  2009110897 A1   9/2009

OTHER PUBLICATIONS

International Search Report and Written Opinion issued in related application No. PCT/US15/10572 mailed Apr. 13, 2015.
(Continued)

*Primary Examiner* — Junior O Mendoza
(74) *Attorney, Agent, or Firm* — Ballard Spahr LLP

(57) ABSTRACT

A system and method is disclosed herein that provides a multi-device, multi-screen experience where original content, other content, and associated data can interact and flow between a primary display device and one or more secondary devices. More particularly, the system and method disclosed herein provides for the delivery and management of digital media content to an end user by providing the multi-device, multi-screen experience where original content, other content, and associated data can interact and flow between devices. The system and method enables an individual to create a virtually universal home commerce and monitoring ecosystem by integrating a device into their home Wi-Fi and content consumption systems.

20 Claims, 4 Drawing Sheets

Related U.S. Application Data continuation of application No. 15/886,922, filed on Feb. 2, 2018, now Pat. No. 10,631,033, which is a continuation of application No. 14/591,309, filed on Jan. 7, 2015, now Pat. No. 9,924,215.

(60) Provisional application No. 61/925,445, filed on Jan. 9, 2014.

(51) Int. Cl.

| | | |
|---|---|---|
| *H04N 21/435* | (2011.01) | |
| *H04N 21/436* | (2011.01) | |
| *H04N 21/4363* | (2011.01) | |
| *H04N 21/45* | (2011.01) | |
| *H04N 21/462* | (2011.01) | |
| *H04N 21/61* | (2011.01) | |
| *H04N 21/643* | (2011.01) | |
| *H04N 21/81* | (2011.01) | |

(52) U.S. Cl.
CPC ... *H04N 21/43615* (2013.01); *H04N 21/4532* (2013.01); *H04N 21/4622* (2013.01); *H04N 21/64322* (2013.01); *H04N 21/8133* (2013.01); *H04N 21/435* (2013.01); *H04N 21/43637* (2013.01); *H04N 21/6156* (2013.01); *H04N 21/6168* (2013.01); *H04N 21/6175* (2013.01); *H04N 21/6193* (2013.01)

(56) References Cited

U.S. PATENT DOCUMENTS

| | | | |
|---|---|---|---|
| 10,631,033 B2* | 4/2020 | McDevitt | H04N 21/4532 |
| 10,958,960 B2* | 3/2021 | McDevitt | H04N 21/41265 |
| 2002/0184195 A1 | 12/2002 | Quian | |
| 2003/0093791 A1 | 5/2003 | Julia et al. | |
| 2006/0026636 A1 | 2/2006 | Stark et al. | |
| 2007/0251521 A1* | 11/2007 | Schackmuth | G06Q 50/12 126/369 |
| 2008/0083003 A1 | 4/2008 | Biniak et al. | |
| 2009/0248672 A1 | 10/2009 | McIntire et al. | |
| 2009/0327894 A1* | 12/2009 | Rakib | H04N 21/84 709/219 |
| 2010/0247061 A1 | 9/2010 | Bennett et al. | |
| 2011/0126555 A1 | 6/2011 | Lee | |
| 2012/0081299 A1 | 4/2012 | Kiao et al. | |
| 2012/0158972 A1 | 6/2012 | Gammill et al. | |
| 2012/0185886 A1 | 7/2012 | Charania et al. | |
| 2012/0199643 A1* | 8/2012 | Minnick | H04N 21/4131 235/375 |
| 2012/0226659 A1* | 9/2012 | Ball | G06F 16/957 707/E17.005 |
| 2013/0170813 A1 | 7/2013 | Woods et al. | |
| 2013/0198642 A1* | 8/2013 | Carney | H04N 21/4722 715/738 |
| 2013/0247117 A1 | 9/2013 | Yamada et al. | |
| 2013/0262569 A1 | 10/2013 | Ahn et al. | |
| 2013/0265261 A1 | 10/2013 | Min | |
| 2013/0347018 A1 | 12/2013 | Limp et al. | |
| 2014/0020033 A1 | 1/2014 | Wilson et al. | |
| 2014/0047487 A1* | 2/2014 | Guedalia | H04N 21/6547 725/80 |
| 2014/0082647 A1 | 3/2014 | Verrilli | |
| 2014/0245335 A1* | 8/2014 | Holden | H04N 21/4223 725/12 |
| 2014/0282717 A1* | 9/2014 | Hutchings | H04N 21/812 725/34 |
| 2014/0351837 A1* | 11/2014 | Amidei | H04N 21/8133 725/13 |
| 2015/0121432 A1 | 4/2015 | Pandey | |
| 2015/0156266 A1 | 6/2015 | Gupta | |
| 2015/0195606 A1 | 7/2015 | McDevitt | |

OTHER PUBLICATIONS

European Supplemental Search Report issued in related application No. 15735129 mailed May 18, 2017.

\* cited by examiner

DIGITAL MEDIA CONTENT MANAGEMENT SYSTEM AND METHOD

CROSS REFERENCE TO RELATED APPLICATIONS

This application is a continuation of U.S. patent application Ser. No. 16/841,926, filed Apr. 7, 2020, which is a continuation of U.S. patent application Ser. No. 15/886,922, filed Feb. 2, 2018, and now issued as U.S. Pat. No. 10,631,033, which is a continuation of U.S. patent application Ser. No. 14/591,309, filed Jan. 7, 2015, and now issued as U.S. Pat. No. 9,924,215, which claims priority to U.S. Patent Provisional Application Ser. No. 61/925,445, filed Jan. 9, 2014, the entire contents of each of which are hereby incorporated by reference in their entirety.

TECHNICAL FIELD

The present patent document relates generally to a system and method for providing the delivery and management of digital media content, and, more particularly, to a system and method that provides a multi-device, multi-screen experience where original content, other content, and associated data can interact and flow between a primary display device and one or more secondary devices.

BACKGROUND

With the continued development of portable media players, social networking services, "smart" internet connected devices, improved wired / wireless data transmission speeds, and the like, individual users continue to have more methods and mediums to create, share, discover and consume more and more digital media content. Today, there exist numerous electronic devices that are used by a consumer to interact with digital media content for entertainment, education, and commerce purposes. These electronic devices include media devices that obtain digital media content from the Internet, cable, satellite, etc., and present or stream the digital media content to the user via audio and/or video display(s), which can be a component of the media device or a separate device, such as a television. Some examples of these media devices include set top boxes, video streaming devices (e.g., Apple TV® and Roku®), smart televisions, and gaming consoles (e.g., Sony PlayStation® and Xbox One®). Other well-known electronic devices used to gather information include laptop and desktop computers, tablets, netbooks, and smartphones. These devices are often used to watch streaming videos, listen to music, chat with friends, engage in social networking, shop, and generally surf the Internet.

Moreover, many consumers often use two or more of these devices concurrently. For example, while watching a live streaming football game on a television, a user may use a tablet or smartphone to check the ranking of his or her fantasy football team, purchase a jersey of his or her favorite player, text a friend telling them to turn on the game, etc. Moreover, there are other ways in which the user may enhance the consuming experience of the content on the television. For example, while watching the football game, the user may perform an online search on the topic relating to the game (e.g., current playoff standings) using a computer, netbook, tablet, smartphone or the like, and then navigate to a site that has additional information on the topic.

Currently, in order to obtain additional information relating to current media content being presented to the user on one device such as the user's television, the user has to exert a significant amount of effort to obtain this additional information on that device or on a secondary device. For example, the user would have to formulate Internet search terms, review the search results, navigate to the selected site to determine whether the information is the information sought by the user, and the like. The user may have to repeat this process several times before finding the precise information he/she desires. This process can be tedious and inconvenient. The two devices are distinct and independent without the digital media content from one flowing to the other.

Moreover, while the consumption of digital media content on multiple devices can be coordinated by a user, the disparate digital media content cannot be simultaneously presented to the user on a single device. For example, if a user is viewing primary source content, such as a live broadcast, on a television, but then wants to view secondary digital media content using a video streaming device, such as Apple TV®, the user must switch between source inputs of the television since the set top box receiving the live broadcast is connected to a first high-definition multimedia interface ("HDMI") input of the television while the video streaming device is connected to a second HDMI input and the television is generally incapable of concurrently displaying content received by two separate inputs. In other words, because the set top box and video streaming device are connected in parallel to the user's television, the parallel configuration only allows for the replacement of the original content by switching source inputs, such that the digital media content from the two devices cannot be consumed by the user simultaneously and/or synchronously.

SUMMARY

Accordingly, a system and method is disclosed herein that provides a multi-device, multi-screen experience where original content (i.e., primary source content and related metadata, other content (i.e., secondary source(s) content and related metadata and device control commands (collectively and individually digital media content—content)) can interact and flow between a primary display device and one or more secondary devices. More particularly, the system and method disclosed herein provides for the delivery and management of content to an end user by providing the multi-device, multi-screen experience where primary source content, primary source content metadata, other secondary source(s) content, secondary source(s) metadata and device control commands can interact and flow between devices. The system and method enables an individual to create a virtually universal home entertainment, education, commerce and monitoring ecosystem by integrating a device into their home Wi-Fi and content creation, distribution, discovery and consumption systems.

According to an exemplary embodiment, a device for managing a presentation of content is provided that includes an input that receives primary source content (and possibly related metadata) and an output that transmits the primary source content (and possibly related metadata) to a first display device to be displayed thereon. The device further includes one or more processors that interpret the primary source content (and possibly related metadata) to identify the primary source content, access additional digital information from a secondary data source that is associated with the primary source content, and cause the additional digital information associated with the identified primary source content to be presented on at least one of the first display device or a second display device.

According to another embodiment, a method for managing a presentation of content is disclosed herein. The method includes receiving primary source content (and possibly related metadata) by an input port, transmitting the primary source content (and possibly related metadata) by an output port to a first display device to be displayed thereon, interpreting the primary source content (and possibly related metadata) to identify data content with the primary source content, accessing additional digital information from a data source that is associated with the primary source content, and transmitting the additional digital information associated with the primary source content to be presented on at least one of the first display device or a second display device.

According to another embodiment, a system for managing a presentation of content is disclosed herein with the system including a first display device, a second display device, and a data communication hub. The data communication hub further includes an input communicatively coupled to receive primary source content, an output communicatively coupled to the first display device, at least one communication interface communicatively coupled with the Internet and secondary systems and a processor. Furthermore, the processor has software that, when executed on the processor, causes the processor to transmit the primary source content via the output to the first display device to be displayed thereon, interpret the primary source content to identify elements of the primary source content, access electronic information from a data source communicatively coupled to the data communication hub, the additional digital information being associated with the identified elements of the primary source content, and present the additional digital information associated with the identified elements on at least one of the first display device or a second display device.

The above and other preferred features described herein, including various novel details of implementation and combination of elements, will now be more particularly described with reference to the accompanying drawings and pointed out in the claims. It will be understood that the particular methods and apparatuses are shown by way of illustration only and not as limitations of the claims. As will be understood by those skilled in the art, the principles and features of the teachings herein may be employed in various and numerous embodiments without departing from the scope of the claims.

BRIEF DESCRIPTION OF THE DRAWINGS

The accompanying drawings, which are included as part of the present specification, illustrate the presently preferred embodiments and together with the general description given above and the detailed description of the preferred embodiments given below serve to explain and teach the principles described herein.

Figure 1:
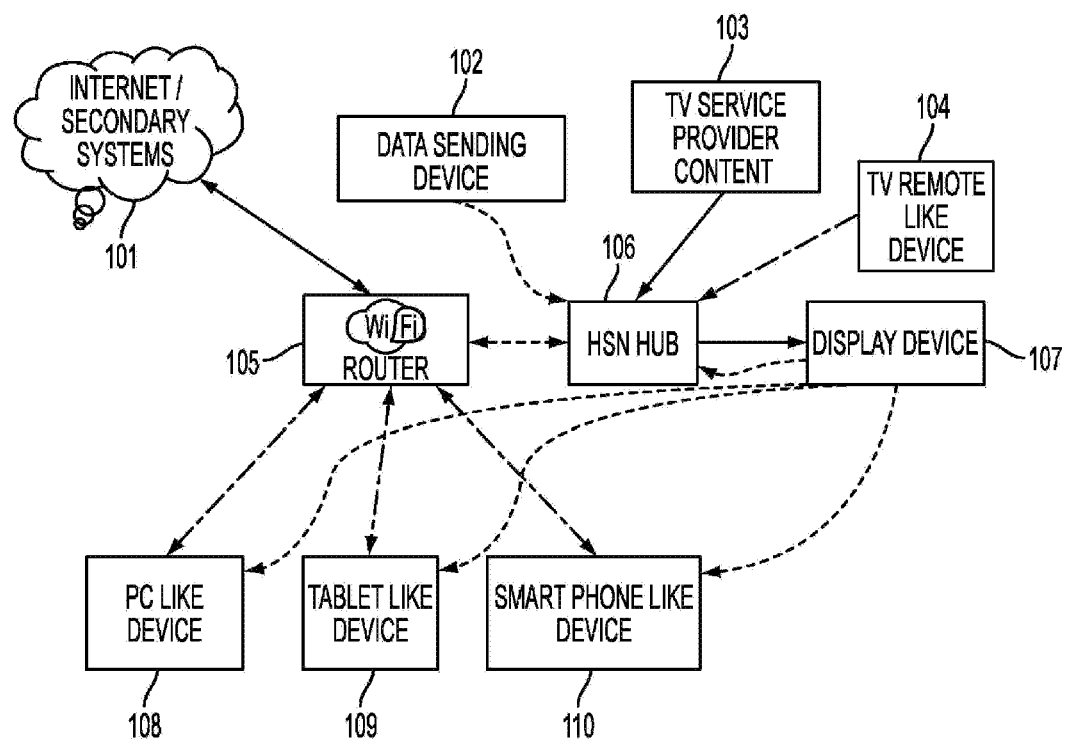
FIG. 1 illustrates the digital media content management system according to an exemplary embodiment of the present disclosure.

The figures are not necessarily drawn to scale and the elements of similar structures or functions are generally represented by like reference numerals for illustrative purposes throughout the figures. The figures are only intended to facilitate the description of the various embodiments described herein and the figures do not describe every aspect of the teachings disclosed herein and do not limit the scope of the claims.

DETAILED DESCRIPTION

Each of the features and teachings disclosed herein can be utilized separately or in conjunction with other features and teachings. Representative examples utilizing many of these additional features and teachings, both separately and in combination, are described in further detail with reference to the attached drawings. This detailed description is merely intended to teach a person of skill in the art further details for practicing preferred aspects of the present teachings and is not intended to limit the scope of the claims. Therefore, combinations of features disclosed in the following detailed description may not be necessary to practice the teachings in the broadest sense, and are instead taught merely to describe particularly representative examples of the present teachings.

In the following description, for purposes of explanation only, specific nomenclature is set forth to provide a thorough understanding of the present invention. However, it will be apparent to one skilled in the art that these specific details are not required to practice the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as data, bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or the like, refer to the action and processes of a computer system, or similar electronic computing device, that manipulates and transforms digital data represented as physical (electronic) quantities within the computer system's registers and memories into other digital data similarly represented as physical quantities within the computer system memories or registers or other such information storage, transmission or display devices.

The algorithms presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the teachings of the invention as described herein.

Moreover, the various features of the representative examples and the dependent claims may be combined in ways that are not specifically and explicitly enumerated in order to provide additional useful embodiments of the present teachings. It is also expressly noted that the dimensions and the shapes of the components shown in the figures are designed to help to understand how the present teachings are practiced, but not intended to limit the dimensions and the shapes shown in the examples.

The system and method disclosed herein provides for the delivery and management of "content" to an end user. For the context of this disclosure, "content" includes, but is not limited to, audio, video, images, metadata, contextual data and transactional data, and the term "user" or "end user" is used interchangeably with "viewer" and/or "individual" and/or "consumer". The system and method disclosed herein provides a multi-device, multi-screen experience where content from a first or primary source content, primary source content metadata, secondary source(s) content, secondary source(s) metadata and device control commands, collectively and individually digital media content—content can interact and flow between a primary display device and one or more secondary devices. The system allows an individual to create a virtually universal (generally agnostic to device manufacturer and/or operating system) home entertainment, education, commerce and monitoring ecosystem by integrating a device (hardware and software) into their home Wi-Fi and content creation, manipulation, distribution, discovery, monitoring and/or consumption system(s).

FIG. 1 illustrates the digital media content management system according to an exemplary embodiment of the present disclosure. It is contemplated that the exemplary system can be implemented in a premise, such as a user's home, hotel room, commercial establishment or the like. Preferably, the system can be implemented in any location that provides a connection to primary source content, at least one display device and preferably access to a wired or wireless Wi-Fi network or similar high-speed wireless network (e.g., 3G, 4G LTE type internet protocol network connectivity).

As shown, the digital media content management system 100 includes a data communication hub 106 that is the device designed to manage content provided to primary display device and/or secondary devices in the system 100. The specific components and functionality of the data communication hub 106 will be described in detail below with respect to FIG. 2. In general, the data communication hub 106 includes a number of wired and wireless inputs and outputs to communicate with various components of the digital media content management system 100.

In the exemplary embodiment, the data communication hub 106 is communicatively coupled to display device 107, which can be any device that is capable of receiving and displaying content (this content can be in any of a variety of digital formats including but not limited to MPEG-1, MPEG-2, MPEG-4, H.263, H.264, H.265, VP9, WMV, AVI, Quicktime, Flash, DivX AAC, MP3, etc.). For example, it is contemplated that display device 107 is a television in the exemplary embodiment, but alternatively the display device 107 can be a tablet device, a personal computer ("PC"), a mobile phone, a stereo or any other electronic device capable of, inter alia, receiving data through standard content distribution networks as is understood to those skilled in the art and presenting it for consumption by a user. It is contemplated that the display device 107 is the "first" or "primary" display device in the exemplary embodiment disclosed herein and that it is communicatively coupled to the data communication hub 106 by a wired or wireless connection, which can be, for example, a variety of transmission methods including, but not limited to, USB cable, coaxial cable, RCA Cable, HDMI cable, or wireless protocol including but not limited to 802.11(multiple), and the like. Using the wired or wireless connection, the display device 107 is configured to receive content from the data communication hub 106 for display and consumption by a user of the display device 107.

The data communication hub 106 is also communicatively coupled either by a wired or wireless connection to a router 105. In the exemplary embodiment, router 105 can be, for example, any standard home or commercial Wi-Fi router configured to receive (or send, or send and receive) content from the Internet and secondary systems 101 and to distribute (or receive, or send and receive) the content to one or more devices connected to the Wi-Fi network of the digital media content management system 100. As should be understood to those skilled in the art, the Internet and secondary systems 101 are preferably any and all of the content on the World Wide Web and/or data (including programming command sets) that are contained in other secondary systems. As will be discussed in detail below, the disclosure herein contemplates that the Internet and secondary systems 101 serve as secondary data source content provider(s) that provide secondary source content related to or as an alternative to the primary source content.

In the exemplary embodiment, the data communication hub 106 is configured to have two way communications with the Internet and secondary systems 101 via router 105. However, in an alternative embodiment, the data communication hub 106 is configured to perform the role of the Wi-Fi router 105, in addition to its other described activities, using a Wi-Fi connection interface discussed below with reference to FIG. 2. In other words, the data communication hub 106 is capable of communicating directly with the Internet and secondary systems 101 and one or more devices connected to the Wi-Fi network of the digital media content management system 100. In a variation of this embodiment, the data communication hub 106 can be configured to communicate with the Internet and secondary systems 101 using any mobile telecommunication network protocol (e.g., 2G, 3G, 4G LTE, and or the like).

As further shown, the data communication hub 106 is also communicatively coupled with the TV service provider content 103, which can be considered a primary source of content or a first data source in the exemplary embodiment. The TV service content provider 103 can be any source content provider (e.g., Broadcast, Cable, Telco, DBS, IP, or source such as DVD player) that delivers content for user consumption and can be in any digital formats and qualities, such as video (live or recorded), images, sounds, pure data or combination of any or all of these. It should be appreciated that while the exemplary embodiment contemplates that the primary source content originates as TV service content from TV service provider 103, one skilled in the art would understand that the primary source content can originate from any service provider of original data content (e.g., original content from a website or the like) serving as a primary source.

Furthermore, the data communication hub 106 can be configured to communicatively couple to a remote control like device 104, which can be, for example, a configurable remote control device for the display device 107 or the like. More particularly, the remote control device 104 can be any type of standard TV remote control provided by the device manufacturer or the TV Service Provider, universal remote control device, or other remote control device, provided the device is capable/configurable to wirelessly control (via infrared light, Bluetooth, ZigBee, Wi-Fi, or the like) at least the data communication hub 106 and the display device 107.

In the exemplary embodiment, one or more data sending devices 102 can also be communicatively coupled to the data communication hub 106. Preferably, the data sending devices 102 can be any device that is capable of transmitting digital data, for example, the data sending devices can be a radio-frequency identification ("RFID") tag fitted to an object (e.g., a carton of milk) that is capable of transmitting data (or creating either a radio or a resonance frequency) about that object (e.g., the carton of milk is a half a gallon and its expiration date). Alternatively the data sending device could be a device that "reads" the RFID tags (e.g., a refrigerator that reads the RFID tags of the items like milk, eggs, etc. contained within them and then passes that information on to the data communication hub 106). Additionally, data sending devices can also be devices with Near Field Communications ("NFC") capabilities or other radio communication devices that can transfer data via physical touching or bringing the device within a certain proximity of the reader.

Accordingly, as shown in FIG. 1, the data communication hub 106 is communicatively coupled to a data sending device 102, a TV service content provider 103, remote control device 104, display device 107, and router 105, However, it should be appreciated by one skilled in the art that the data communication hub 106 is not required to be coupled to every one of these components and that the exemplary system can be implemented with the data communication hub 106 being coupled to less than every one of the devices shown in FIG. 1.

As noted above, the router 105 is capable of communicating data between the Internet and secondary systems 101 and one or more devices connected to the Wi-Fi network, including the data communication hub 106. The data communication hub 106 retrieves "additional" or "secondary" source content from the Internet or secondary systems 101 in the exemplary embodiment. In particular, the initial retrieval command structure for the secondary source content can be achieved through a variety of means including, but not limited to, pre-designated searches based on primary source content descriptive key words, closed captioning content, current or historical popular search terms related to the primary source content, user historical search terms, user profile information, and the like.

In addition, the exemplary system 100 also contemplates that one or more "second" or "secondary" display devices can be coupled to the router 105 and implemented as part of the digital media content management system 100. As shown, the secondary display devices can include PC like device 108, tablet like device 109 and/or smartphone like device 110. In particular, PC device 108 can be, for example, any type of personal computer, tablet device 109 can be, for example, any type of "tablet" computing device (including tablets of various sizes and form factors from large format tablets to smaller watch style tablet like devices), and smartphone device 110 can be, for example, any type of smartphone, as would be appreciated to one skilled in the art.

It should be appreciated that no specific operating system, make, model, etc. of personal computer, tablet or smartphone is required for the disclosed system. In one refinement of the exemplary embodiment, it is contemplated that any one of these secondary devices (e.g., smartphone device 110) can serve as the TV remote control device 104. An exemplary application describing the use of a smartphone as a pointing device is described in U.S. Pat. No. 8,717,289, the contents of which are hereby incorporated by reference. In one embodiment, the one or more secondary display devices 108, 109 and/or 110 can be connected to the data communication hub 106 by any of a variety of pairing methodologies, such as "All Share" or "AllJoyn" via the Wi-Fi or Bluetooth communications, as would be understood to one skilled in the art.

As illustrated in FIG. 1, the data communication hub 106 is connected to the home Wi-Fi network via router 105 over a standard wired or wireless connection. The data communication hub 106 is configured to receive original data content (i.e., primary source content) from TV service provider 103 (e.g., Broadcast, Cable, Telco, DBS, IP, etc.) and is also connected in series to the display device 107 (e.g., a TV, monitor, etc.). Advantageously, by connecting the data communication hub 106 in series rather than in parallel, the data communication hub 106 can add and/or display "other" or "additional" or "secondary" source content (e.g., complementary or alternative data that can augment the primary source content—for example data describing a recipe of something that is being cooked on a cooking TV show) content on top of, adjacent to, or in place of the "original" primary source content. In contrast, conventional configurations are connected in parallel such that each data source is connected to a separate data input of the display device 107. As a result, a parallel configuration only allows for the replacement of the primary source content (e.g., to switch between TV via a set top box and a Nefflix movie via Apple TV would require the viewer to switch the TV input between the two), as would be understood to one skilled in the art. By connecting the data communication hub 106 in series with the display device 107, the data communication hub 106 can control how content is provided to the end user/viewer. In other words, the individual can consume any content delivered to the communications hub 106 or a combination of primary source content and other secondary source content without changing the input on the display device 107.

Moreover, in the exemplary embodiment, the data communication hub 106 is further configured to receive and act upon navigation instructions from any standard remote control device (e.g., a remote control device provided by the display device 107 manufacturer and/or the TV service provider 103, etc., via control systems such as Bluetooth, IR, and the like. Additionally, the data communication hub 106 can be configured to receive and act upon data received from objects that support device to device communications (e.g., RFID tags, NFC, etc.). For example, the data communication hub 106 can be configured to receive information (either continuously, periodically, or the like) that is transmitted from one or more data sending devices 102.

As described above, the secondary systems and secondary devices (e.g., PC's 108, tablets 109, smartphones 110, and the like) are communicatively coupled to the Wi-Fi network of the digital media content management system 100. As a result, the data communication hub 106 can have two way communications with secondary systems and secondary display devices via router 105. Alternatively, the data communication hub 106 can include a Wi-Fi connection, a Bluetooth connection, or similar type connection (discussed below) enabling the data communication hub 106 to wirelessly communicate directly with the secondary devices 108, 109, and 110. In either embodiment, through this architecture the various devices are configured to work together to create a unified multi-device, multi-screen experience where primary source content, primary source content metadata, secondary source(s) content, secondary source(s) metadata and device control commands can interact and flow between the display device 107 (i.e., the primary display device) and the secondary devices (e.g., PC's 108, tablets 109, smartphones 110, and the like) as well as to the Internet and secondary systems 101 and back.

In one further refinement of the exemplary embodiment, the digital media content management system 100 provides the ability to support a feedback loop in which the primary source content from TV service content provider 103 can be monitored and recognized through systems like automated content recognition ("ACR"), image recognition, barcodes, QR codes, digital watermarking, digital fingerprinting, recognize and shop (as described in U.S. Patent Publication No. 2012/0183229), and the like) that are resident in the data communication hub 106 or can be on Internet and secondary systems 101 that can be accessed via the data communication hub 106 and then relevant "additional" data/information is sourced and delivered to the display device 107 and/or the secondary devices 108, 109 and 110.

Figure 2:
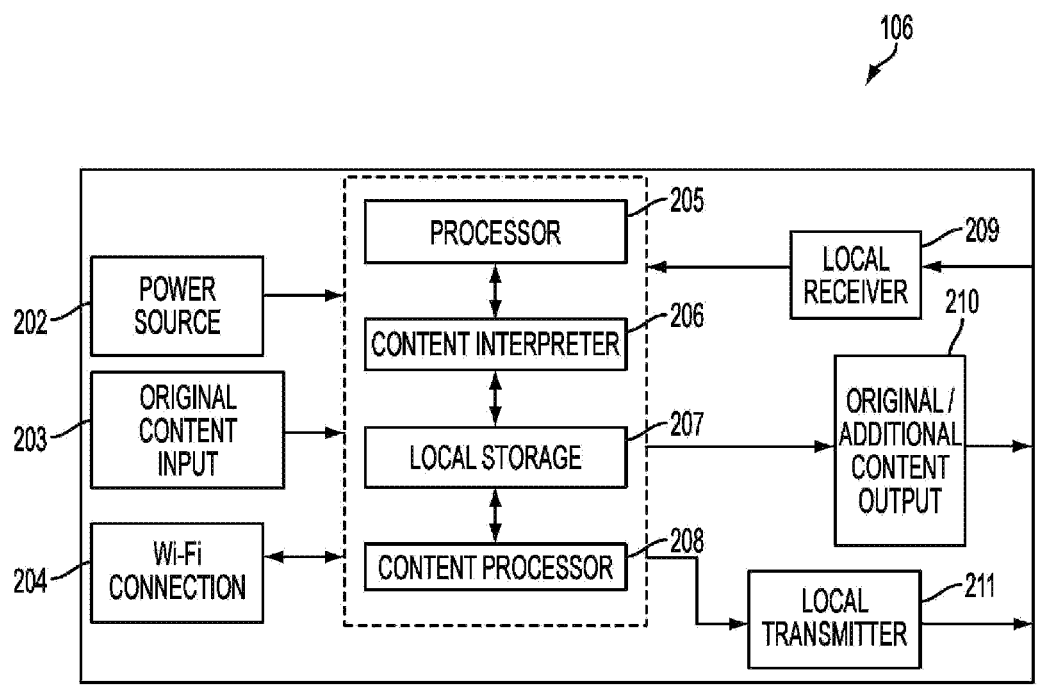
FIG. 2 illustrates a block diagram illustrating the exemplary components of the data communication hub according to an exemplary embodiment of the present disclosure.

FIG. 2 illustrates a block diagram illustrating the exemplary components of the data communication hub 106 according to an exemplary embodiment of the present disclosure. It should be appreciated that the specific circuitry of each of the components and internal connections there between is not shown in FIG. 2 so as to not unnecessarily obscure the aspects of the disclosure.

As shown in FIG. 2, the data communication hub 106 includes a power source 202. Preferably, the data communication hub 106 is powered by a variety of means including but not limited to USB, Micro-USB, home AC to DC transformer, battery, HDMI, Cat-5, and the like.

The data communication hub 106 further includes an original content input 203 (e.g., an input port). As described above, the data communication hub 106 can have primary source content input from a variety of means including but not limited to a HDMI, Coax, RCA, S-Video, USB, Antenna, wireless, and the like. It should be appreciated that where a service provider requires the use of a set top box for the decoding and/or decryption of the received signal, the original content input 203 of the data communication hub 106 is attached to the set top box issued by a cable provider, and can be connected by an HDMI cable or the like, for example. In an alternative embodiment, the set top box can be manufactured to include the data communication hub 106.

As further described above, the data communication hub 106 can be connected to the Internet and secondary systems 101 as well as secondary devices 108, 109 and 110 by a variety of means including but not limited to wired or wireless, Wi-Fi protocol, Mobile protocols (e.g., 2G, 3G, 4G, LTE, etc.), Bluetooth, NFC, ZigBee, and the like. Accordingly, in the exemplary embodiment, the data communication hub 106 includes a Wi-Fi connection or interface 204.

The data communication hub 106 further contains one or more processors. As shown in FIG. 2, the data communication hub 106 includes processor 205, which is an internal computer processor provided to manage systems, including management of a gateway to direct content (individual source content and/or combined content) to either the display device 107 and/or one or more of the secondary display devices 108, 109 and 110. The content to the two devices can be the same or different. The processor 205 is configured to execute one or more computer programs to perform actions by accessing and operating on the data related to or contained within the content. Preferably, the processor 205 can be specially constructed for the required purposes and configured by a computer program stored thereon. Such a computer program may be stored in a computer readable storage medium (e.g., local storage 207 discussed below). Furthermore, as will be described below, the one or more computer programs (i.e., a program, software, software application, script, or code) executed by the data communication hub 106 control its operations and can be written in any form of programming language, including compiled or interpreted languages, declarative or procedural languages. The computer program(s) can also be deployed in any form, including as a stand-alone program or as a module, component, subroutine, object, or other unit suitable for use in a computing environment.

The data communication hub 106 further includes content interpreter 206, which can be an additional processor for monitoring and analyzing the source content received from TV primary source content provider 103. The content interpreter 206 can be entirely internal to the data communication hub 106 or it can contain devices such as a microphone, a camera and the like, to collect data related to the primary source content as well as surrounding physical location contextual information. In the exemplary embodiment, the content interpreter 206 is further configured to monitor and analyze the secondary source(s) content and the combined primary and secondary source(s) content. Although the content interpreter 206 is shown as a separate component in FIG. 2, it should be appreciated to one skilled in the art that processor 205 can be configured to perform the analysis/processing functions of the content interpreter 206 in one embodiment.

As noted above, the data communication hub 106 includes local storage 207. In the exemplary embodiment, the local storage 207 can include, for instance, a disk shaped media such as CD-ROM (compact disc-read only memory), magneto optical disc, digital video disc-read only memory or DVD-ROM, digital video disc-random access memory or DVD-RAM, a floppy disc, a memory chip such as random access memory or RAM, read only memory or ROM, erasable programmable read only memory or E-PROM, electrical erasable programmable read only memory or EE-PROM, a rewriteable card-type read only memory such as a smart card, a magnetic tape, a hard disc, and any other suitable means for storing a program, content data therein, and other data that will be discussed below.

The data communication hub 106 also includes a content processor 208 that is provided and configured to process the content into a package that can be delivered to the display device 107 and/or one or more of the secondary devices 108, 109 and 110. Although the content processor 208 is shown as a separate component in FIG. 2, it should be appreciated to one skilled in the art that processor 205 can be configured to perform the processing functions of the content processor 208 in an alternative embodiment. Moreover, in general, it should be understood that the processes and logic flows described herein can be performed by processor 205 alone or in combination with the content interpreter 206 and/or content processor 208.

As further shown, the data communication hub 106 can include a local receiver 209 (e.g., an RFID or NFC reader)

that is configured to receive data content from objects like RFID tags and other information broadcast sources (e.g., data sending devices 102) and also a local transmitter 211 configured to transmit content to secondary devices 108, 109 and 110. Moreover, the data communication hub 106 includes one or more content outputs 210 (e.g., an HDMI output port) that pass the content to the display device 107 using any one of a variety of means including but not limited to, HDMI, Coax, RCA, S-Video, USB, Antenna, wireless, and the like.

As discussed above, in the exemplary embodiment, the data communication hub 106 is a separate, discrete piece of hardware, but in alternative embodiments it could be integrated into the display device, the router, a set top box, or other component(s) of the digital media content management system 100.

Figure 3:
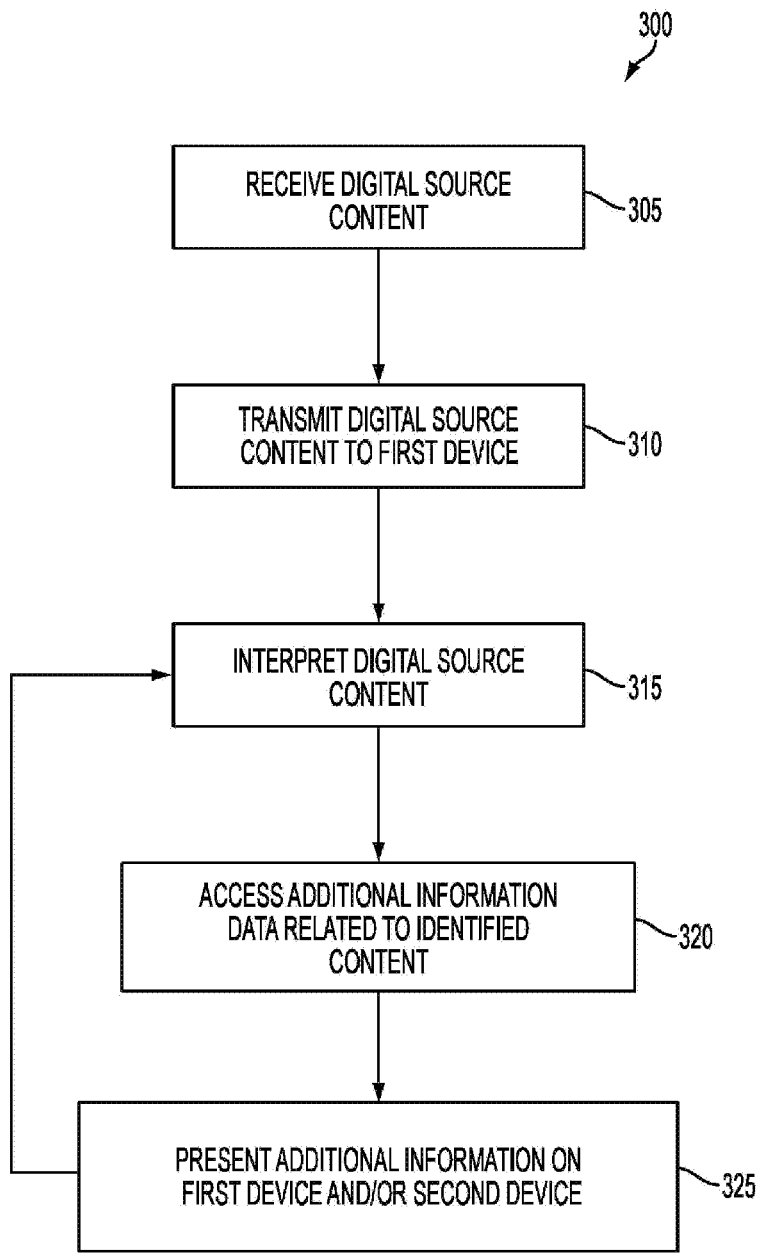
FIG. 3 illustrates a digital media content management method according to an exemplary embodiment of the present disclosure.

FIG. 3 illustrates a data content management method according to an exemplary embodiment of the present disclosure. The method 300 shown in FIG. 3 and described below is explained by applying an exemplary implementation to facilitate explanation of the disclosed method. However, it should be appreciated that the implementation described below is provided only for exemplary purposes and in no way should the disclosed method be so limited.

As shown in FIG. 3, at an initial step 305, content is received from a content provider (e.g., TV service content provider 103) by the data communication hub 106. In particular, the original content input 203 of the data communication hub 106 can be an HDMI connection that is attached to a set top box issued by a cable provider or the like by an HDMI cable, for example. Accordingly, the set top box receives the primary source content provided by a TV service content provider 103 and outputs this primary source content via the HDMI cable, which is then input to the original content input 203 of the data communication hub 106. In the first example, an individual is watching a football game on the display device 107, such as the individual's television, for example. Thus, the football game is broadcast as live primary source content from TV service content provider 103 and is received by the data communication hub 106 via TV service content provider 103 and, for example, a set top box. It should be appreciated that the exemplary embodiment utilizes a set top box for the decoding (and decrypting if needed) of the primary source content, but the primary source content can be transmitted directly to the data communication hub 106 in an alternative embodiment, or the data communication hub 106 can be part of a set top box.

Next, at step 310, the data communication hub 106 transmits or "passes through" the received primary source content to a primary display device, which is the display device 107 or user's television in the exemplary embodiment. Preferably, the display device 107 is coupled to the content output 210 of the data communication hub 106 using an HDMI cable or other wired or wireless connection, such as Coax, RCA, S-Video, USB, Antenna, wireless, and the like. Accordingly, upon receiving the primary source content, the data communication hub 106 outputs the content (e.g., the football game) to the display device 107 via content output 210.

At step 315, the content interpreter 206 of the data communication hub 106 interprets or recognizes the content or elements of the content that is being displayed on the display device 107. Although step 315 is shown in FIG. 3 as occurring after step 310, it should be appreciated that step 315 can also be performed concurrently with step 310. Step 315 specifically involves the content interpreter 206 identifying, for example, the general subject matter of the content (e.g., a football game on a specific date between two specific teams) or one or more detailed specific items (e.g., a team logo or a player) in the content being displayed on the display device 107, or the location (as an X/Y coordinate location in the content of a detailed specific item as described in U.S. Patent Publication No. 2012/0183229. The content and its related elements can be identified by comparing images, such as raw data or pixels, in the content with previously-stored images (e.g., images stored in local storage 207 or in the "cloud") or based on primary source or secondary source(s) metadata transmitted with the primary source content.

Once the content is interpreted or identified, the data communication hub 106 identifies additional information relating to the interpreted content that can be presented to the user. More particularly, at step 320, the data communication hub 106 accesses the Internet and secondary systems 101 by a Wi-Fi connection or interface 204, as described above. In the exemplary embodiment, the processor 205 of the data communication hub 106 performs a series of targeted queries on the Internet and secondary systems to access information (e.g., statistics or a highlight video relating to a player in the game or websites where the user can buy the player's jersey) to be presented to the user. As described above, one exemplary system that recognizes an item (or sets of items) in source content and identifies additional data or metadata about the identified item(s) is U.S. Patent Publication No. 2012/0183229. It should further be appreciated that the targeted queries will be specific to the individual user in one embodiment. As will be described in more detail below, the data communication hub 106 can store profile information or data in the local storage 207 relating to the specific user (e.g., favorite football team, recent purchases, or the like) and access information on the Internet and secondary systems 101 based at least partially on using queries that are tailored to the user profile data.

Next, at step 325, the processor 205 of the data communication hub 106 in conjunction with the content processor 208 then presents the user of the display device 107 with the other information/content (or a portion thereof), which can be, for example, football related products that the individual could purchase and also browse related products, or get more detailed information about the products, the game, the player, or the like. By interpreting the primary source content received from the first data source (e.g., TV service content provider 103) and then identifying additional information related to the interpreted content, the data communication hub 106 is effectively configured to synchronize the transmission of both the primary source content and additional information for a coordinated presentation to the user. As discussed above, this synchronized transmission and presentation can be performed either only on the primary display device or on both primary display device and the secondary display device.

In one embodiment, this secondary source content can be presented to the user by pre-structured overlay templates and menus on either the primary display device and/or the secondary display device, which can be navigated using either the standard remote control device and/or the connected device. In one refinement, the pre-structured overlay templates further enable the user to upload user-generated content (e.g., a picture of a finished meal as discussed below) to the Internet and/or secondary systems 101 for purchase activity, social sharing and the like. Furthermore, in one additional embodiment, the system either automatically, or in response to user control, launches an electronic shopping application enabling the user to purchase one or more of the displayed products. Exemplary applications include the electronic shopping systems disclosed in U.S. Pat. Nos. 7,752,083 and 7,756,758, and U.S. Patent Publication No. 2010/0138875, the contents of each of which are hereby incorporated by reference.

Because the data communication hub 106 is serially connected between the TV service content provider 103 and the display device 107, the data communication hub 106 is capable of concurrently presenting (e.g., displaying) the user with primary source content (and possibly primary source content metadata) from the TV service content provider 103 and the secondary source content (and possibly secondary source content metadata) or additional relevant information accessed from the Internet and secondary systems 101. For example, the processor 205 can generate an overlay (e.g., an image, a hyperlink, or the like) to be displayed over or adjacent to the primary source content being displayed on the display device. Alternatively (or in addition thereto), the content can be transmitted by the local transmitter 211 (e.g., a direct wireless connection like Bluetooth or a Wi-Fi connection by router 105) to one or more of the secondary display devices 108, 109 and 110. In this refinement, the user can continue to view primary source content on one device (i.e., the primary device or display device 107) and also synchronously view the secondary source content accessed from the Internet and secondary systems 101 on a second device (i.e., one or more of secondary devices 108,109 and/or 110). In this refinement, the user can view the content and, if desired, complete a purchase using such secondary device.

As further shown in FIG. 3, step 315 through step 325 can be repeated as a loop while the user is viewing the primary source content provided by TV service content provider 103 on display device 107, for example. Thus, as the primary source content changes (e.g., a channel or show change or the like), the data communication hub 106 will access and change the secondary source content to be presented to the user.

In one further refinement of the exemplary method, prior products purchased by the individual that relate to the primary source content (i.e., the football game) are fitted with individual RFID tags (i.e., data sending devices 102). These tags can transmit information relating to the purchased products that is received by local receiver 209 of the data communication hub 106 using conventional data communication techniques for RFID tags as is known to those skilled in the art. In other words, once a product is delivered to a user's home or a user returns home from purchasing a product, the user can physically move the product within the necessary distance for the local receiver 209 to receive the electromagnetic fields transmitted by the RFID tags and carrying item data relating to the associated product. Or, alternatively, the item with the RFID tag is placed within another device that can read the tag and is communicatively coupled with the data communication hub 106 (e.g., a carton of milk with an RFID tag that provides descriptive information about the milk (e.g., container size, brand, purchase date, expiration date, etc.) is placed in a refrigerator that has the ability to read the tag and report on it to the data communication hub 106). In turn, the local receiver 209 is coupled to the local storage 207 of the data communication hub 106, which can store and index products owned by the user, including electronic data relating to product details such as the item's size (if applicable), date the product is indexed, the type of product, and the like. The indexing data is referred to herein as "item data". The processor 205 and/or the content interpreter 206 can use this information to refine the product search criteria (e.g., team, size, etc.) queried to the Internet and secondary systems 101, as discussed above, so that the products presented to the individual are customized or targeted for that individual.

Figure 4:
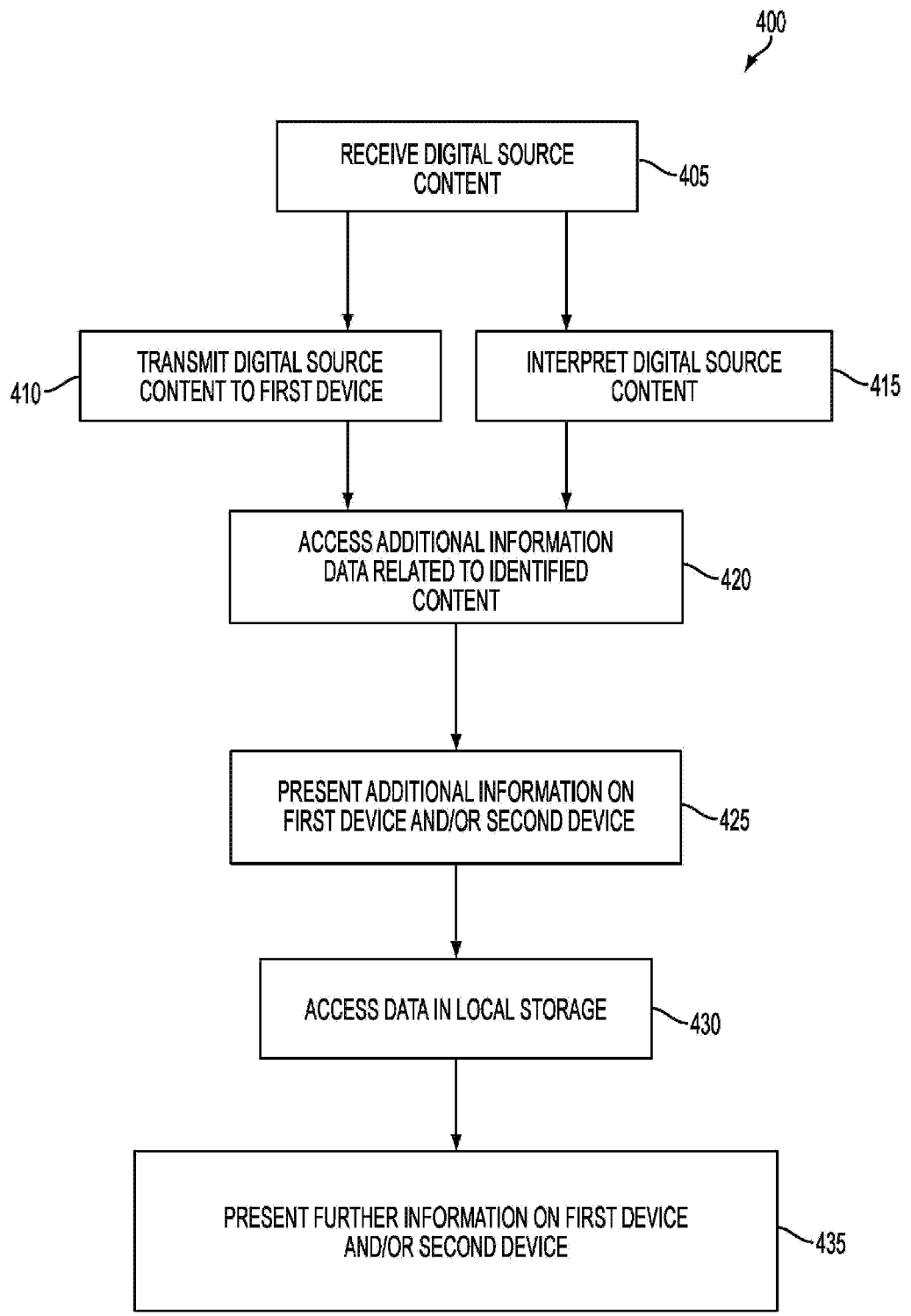
FIG. 4 illustrates another digital media content management method according to an exemplary embodiment of the present disclosure.

FIG. 4 illustrates another data content management method according to an exemplary embodiment of the present disclosure. Similar to FIG. 3, the method shown in FIG. 4 applies an exemplary implementation to facilitate explanation of the disclosed method. However, it should be appreciated that the implementation described below is provided only for exemplary purposes and in no way should the disclosed method be so limited. Moreover, many of the specific technical implementation details to employ the method of FIG. 4 are the same as described above with respect to FIG. 3 and will not be repeated below.

As shown in FIG. 4, initially at step 405, primary source content is received by the data communication hub 106 from TV service content provider 103. In this example, the primary source content can be a cooking show. At step 410, the data communication hub 106 then transmits the primary source content (i.e., the cooking show) to a first primary display device (e.g., display device 107) to be displayed to the user.

Concurrently, at step 415, the content interpreter 206 of the data communication hub 106 recognizes that the primary source content on the display device 107 relates to a cooking show in a similar manner as described above with respect to FIG. 3. It should be appreciated that while step 415 is performed concurrently to step 410 and shown in parallel in FIG. 4, step 415 can be performed subsequent to step 410 in an alternative embodiment.

Next, at step 420, the data communication hub 106 then communicates with the Internet and secondary systems 101, via Wi-Fi Connection 204 and router 105, and identifies information relating to the cooking show, such as a recipe for the item being prepared on the cooking show. Then, at step 425, the content processor 208 of the data communication hub 106 causes the identified recipe to be displayed on the display device 107 and/or one or more of the secondary devices 108, 109 and/or 110, as described above. The recipe, which is considered the secondary source content, can be displayed on top of (i.e., as an overlay), adjacent to, or in place of the primary source content (i.e. the cooking show). This operation is controlled by processor 205 of the data communication hub 106 that manages how the content is presented to the individual on either the display device 107 and/or the one or more of the secondary devices 108, 109 and/or 110.

The management for how data is presented to the user can be controlled by the programmer of the software executed by the data communication hub 106, by user-defined settings, or the like. In one embodiment, a "call to action" can be displayed on the primary display device that enables the user to request the available secondary source content on the primary display device. Alternatively, one or more secondary devices that are paired with the primary displayed device (discussed below) can launch an "App" (either user controlled or automatically) that begins presentation of the secondary source content. For example, the software of the data communication hub 106 can be programmed to include a list of priorities for how the secondary source content is presented to the user of the device(s). In one embodiment, if the data communication hub 106 detects an active wireless connection with one or more of the secondary devices 108, 109 and/or 110, the data communication hub 106 will automatically send an instruction to such devices to launch a software application (e.g., open a webpage) that presents the secondary source content (e.g., the recipe) to the user. Alternatively, if the data communication hub 106 does not detect an active wireless connection with one or more of the secondary devices 108, 109 and/or 110, the data communication hub 106 will create a digital image to be displayed as an overlay, for example, that presents the recipe in a portion of the screen of the display device 107. In yet another embodiment, a user interface for the data communication hub 106 can be presented to the user on one of the secondary devices 108, 109 or 110, which can enable the user to prioritize how the secondary source content is presented to the user. For example, the user could define the settings such that the secondary source content is only presented on the secondary device 108, 109 and/or 110, but is not presented on the first or primary display device, such as display device 107. In a further embodiment, the additional information is not initially presented on one of the first or second devices, but instead, the user is provided with a "More Info" button, which is either displayed on the screen or provided on the remote control, and presents the additional information to the user when selected.

As further shown in FIG. 4, at step 430 the processor 205 of the data communication hub 106 accesses the local storage 207 to identify user profile data relating to the secondary source content being presented to the user. In the cooking recipe example, the processor 205 may determine what ingredients are necessary to make the recipe and also determine those ingredients that are currently in the user's possession as well as those ingredients that the user would need to complete the recipe.

As described above, the data communication hub 106 includes a local receiver 209 that can receive information via NFC from a data sending device 102, such as an RFID tag, for example. Thus, in the current example, it is contemplated that each ingredient or grocery item that the user purchases has an RFID tag that transmits data relating to the product to the local receiver 209, which, in turn, stores the information as "item data" in the local storage 207. Alternatively, the user can update an active inventory of items through a user interface for the data communication hub 106 that can be accessed by one or more of the secondary devices 108, 109 and/or 110, for example. In either event, at step 430, the processor accesses the local storage to identify what additional ingredients would be needed for the user to complete the recipe relating to the cooking show. This secondary source content can be provided to the individual. At step 435, the user then can be presented with additional information on one or more of the secondary display devices 108, 109 and/or 110, which could be, for example, a link to a grocery website to purchase the additional ingredients for the recipe. Thus, if the individual desires, an order for the missing ingredients can be completed via the secondary device 108, 109 and/or 110.

As a further discussion of the system and method described herein, the following is an additional exemplary embodiment of the invention. In the following example, it is contemplated that a user has set up the data communication hub 106 as shown in FIG. 1 where the primary source content is TV programming over a cable system through a set top box and the data communication hub 106 is attached to a TV via an HDMI cable and, in turn, the hub 106 is plugged into the set top box via an HDMI connector. Similar to the foregoing example, this additional embodiment contemplates that a cooking show is selected by the user to watch on the TV as the primary source content, and when the cooking show passes through the data communication hub 106, the primary source content is recognized as the cooking show. As noted above, this recognition can be achieved by a variety of means including, but not limited to, video/audio watermarking/fingerprinting, reading associated metadata, matching closed captioning data, matching to a programming guide, ACR, and the like. In an additional embodiment the user can recognize elements in the primary source content and initiate the following steps. Once the primary source content is identified, additional related (complementary or alternative) secondary source content is retrieved from the Internet or secondary systems 101. The initial retrieval command structure for the secondary source content can be achieved through a variety of means including, but not limited to, template pre-designated searches based on primary source content descriptive key words, closed captioning content, current or historical popular search terms related to the primary source content, user historical search terms, and the like.

Next, notification to the user of available secondary source content can be sent to the user by a variety of means including, but not limited to, a notification to the secondary device (e.g., a connected mobile device, such as a phone or tablet that is connected to the data communication hub 106 by any of a variety of pairing methodologies "All Share" or "AllJoyn" via Wi-Fi or Bluetooth, etc.) or by a graphic overlay on the primary display device (e.g., "Click OK on your TV or Tablet for more information"). As part of the pairing process or as an independent action, a preloaded hub application is activated on the tablet. This tablet application can be used for a variety of activities including being a set top box/TV remote control, a secondary screen for primary or secondary source content, as well as a navigation tool to control the nature and location of primary and secondary source content and access to secondary systems. In this case, the user chooses to continue to view the primary source content (i.e., the Cooking Show) on the primary display device (i.e., the TV) and is presented with an option to click for more information on the tablet. For example, the cooking show may be demonstrating how to make French toast on the TV and, concurrently, on the connected tablet there can be an option to click for more information on the hub application which facilitates multi-screen interactivity. Following tablet/hub pairing, a message asking if additional information related to the cooking show is wanted. If more information is selected then a list of required ingredients and a detailed recipe is presented. If the user chooses the option to make the French toast, the data communication hub 106, which in one embodiment can be commutatively attached to RFID reading devices in the refrigerator and the cupboards, takes an inventory of current available ingredients in the user's home. Unfortunately, in this case where there is no bread or cinnamon the user cannot make French toast, the user can be notified of this via the App.

Then, via the App and the related programming on the data communication hub 106 and the connection to the Internet and secondary systems 101, the user is offered options to purchase the missing items. Then the user searches via the Internet and secondary systems 101 for alternative recipes using what is currently available in his home. In this case the user finds that given the available ingredients a western omelet is the best choice. The user finds a video of the preparation of an omelet on the Internet and pushes the video to the TV via the data communication hub 106 to watch it on a bigger screen while preparing the omelet. Upon the decision to make the omelet, the data communication hub 106, which is communicatively connected to the stove, causes the stove to preheat to the desired temperature. In one refinement, upon completion of preparing the omelet, the user takes a photo with their tablet and sends it to the producers of the cooking show to display what would be better than French toast. Yet further, upon completion of the omelet, the user utilizes the tablet to change the primary source content to programming on another TV channel.

It should be understood that while the foregoing has been described in conjunction with exemplary embodiments of the inventive system, it is understood that the term "exemplary" is merely meant as an example, rather than the best or optimal. Accordingly, the disclosure herein is intended to cover alternatives, modifications and equivalents, which may be included within the spirit and scope of the disclosed system.

Additionally, in the preceding description, numerous specific details have been set forth in order to provide a thorough understanding of the present disclosure. However, it should be apparent to one of ordinary skill in the art that the embodiments described herein may be practiced without these specific details. In other instances, well-known methods, procedures, and components have not been described in detail so as not to unnecessarily obscure aspects of the disclosure herein.

What is claimed is:

1. A method comprising:
receiving, from a primary content source, based on a request from a user device, primary content configured for a primary display at a premises, wherein the primary content comprises one or more digital watermarks;
querying, based on the one or more digital watermarks in the primary content, one or more local radio-frequency identification (RFID) enabled devices at the premises;
receiving, from the one or more local RFID enabled devices, product information;
determining, based on the product information received from the one or more local RFID enabled devices, secondary content configured for a secondary display;
automatically sending, to the secondary display, the secondary content; and
causing output, via the secondary display, of the secondary content.

2. The method of claim 1, wherein the primary content comprises at least one of: streaming content, on-demand content, live television content, audio content, video content, augmented reality content, or virtual reality content.

3. The method of claim 1, further comprising determining, based on the product information, one or more internet search histories associated with the premises.

4. The method of claim 1, further comprising performing, on the primary content, at least one of: object detection, object recognition, facial recognition, digital signature analysis, digital fingerprint analysis, or processing metadata.

5. The method of claim 1, wherein the one or more local RFID enabled devices are configured to query one or more RFID tags.

6. The method of claim 1, wherein the secondary content comprises one or more of: an advertisement associated with one or more objects at the premises or data associated with an object at the premises.

7. The method of claim 1, wherein the secondary display comprises a user interface, the method further comprising receiving, via the user interface, a user input associated with the secondary content.

8. A system comprising:
a computing device configured to:
receive, from a primary content source, based on a request from a user device, primary content configured for a primary display at a premises, wherein the primary content comprises one or more digital watermarks;
query, based on the one or more digital watermarks in the primary content, one or more local RFID enabled devices at the premises;
receive, from the one or more local RFID enabled devices, product information,
determine, based on the product information received from the one or more local RFID enabled devices, secondary content configured for a secondary display;
automatically send, to the secondary display, the secondary content; and
cause output, via the secondary display, of the secondary content; and
the secondary display configured to:
output the secondary content.

9. The system of claim 8, wherein the primary content comprises at least one of: streaming content, on-demand content, live television content, audio content, video content, augmented reality content, or virtual reality content.

10. The system of claim 8, wherein the computing device is further configured to determine, based on the product information, one or more internet search histories associated with the premises.

11. The system of claim 8, wherein the computing device is further configured to perform, on the primary content, at least one of: object detection, object recognition, facial recognition, digital signature analysis, digital fingerprint analysis, or processing metadata.

12. The system of claim 8, wherein the one or more local RFID enabled devices are configured to query one or more RFID tags.

13. The system of claim 8, wherein the secondary content comprises one or more of: an advertisement associated with one or more objects at the premises or data associated with one or more objects at the premises.

14. The system of claim 8, wherein the secondary display comprises a user interface, wherein the computing device is further configured to receive, via the user interface, a user input associated with the secondary content.

15. An apparatus, comprising:
one or more processors; and
memory storing processor executable instructions that, when executed by the one or more processors, cause the apparatus to:
receive, from a primary content source, based on a request from a user device, primary content configured for a primary display at a premises, wherein the primary content comprises one or more digital watermarks;
query, based on the one or more digital watermarks in the primary content, one or more local RFID enabled devices at the premises;
receive, from the one or more local RFID enabled devices, product information;
determine, based on the product information received from the one or more local RFID enabled devices, secondary content configured for a secondary display;
automatically send, to the secondary display, the secondary content; and cause, via the secondary display, output of the secondary content.

16. The apparatus of claim 15, wherein the primary content comprises at least one of: streaming content, on-demand content, live television content, audio content, video content, augmented reality content, or virtual reality content.

17. The apparatus of claim 15, wherein the processor executable instructions, when executed by the one or more processors, further cause the apparatus to determine, based on the product information, one or more internet search histories associated with the premises.

18. The apparatus of claim 15, wherein the processor executable instructions, when executed by the one or more processors, further cause the apparatus to perform, on the primary content, at least one of: object detection, object recognition, facial recognition, digital signature analysis, digital fingerprint analysis, or processing metadata.

19. The apparatus of claim 15, wherein the processor executable instructions that, when executed by the one or more processors, cause the apparatus to query the one or more local RFID enabled devices, cause the one or more local RFID enabled devices to query one or more RFID tags.

20. The apparatus of claim 15, wherein the secondary content comprises one or more of: an advertisement associated with one or more objects at the premises or data associated with one or more objects at the premises.

* * * * *